PULSED RADIO-FREQUENCY GENERATOR

Original Filed June 17, 1960 3 Sheets-Sheet 1

INVENTORS.
Frank J. Opolski,
George O'Neal, Jr. &
Carroll B. Range,
BY Paul & Paul
ATTORNEYS.

PULSED RADIO-FREQUENCY GENERATOR

Original Filed June 17, 1960 3 Sheets-Sheet 2

INVENTORS.
Frank J. Opolski,
George O'Neal, Jr. &
Carroll B. Range,
BY Paul & Paul
ATTORNEYS.

INVENTORS.
Frank J. Opolski,
George O'Neal, Jr. &
Carroll B. Range,
BY Paul & Paul
ATTORNEYS.

3,263,182
Patented July 26, 1966

3,263,182

PULSED RADIO-FREQUENCY GENERATOR

Frank J. Opolski, Dearborn, George O'Neal, Jr., Detroit, and Carroll B. Range, Livonia, Mich., assignors to Detrex Chemical Industries, Inc., Detroit, Mich., a corporation of Michigan Continuation of application Ser. No. 36,796, June 17, 1960. This application Feb. 12, 1965, Ser. No. 436,712
2 Claims. (Cl. 331—71)

This application is a continuation of an earlier filed application, Serial Number 36,796, filed June 17, 1960, entitled, "Radio Frequency Generator For Driving Piezoelectric Transducers."

This invention relates to a radio frequency (R.-F.) generator for driving or activating piezoelectric of electrostrictive transducers such as are used in ultrasonic cleaning.

The radio frequency generator of our present invention employs a minimum of components and yet provides trouble-free operation over extended periods of continuous use, such as are encountered in industrial ultrasonic cleaning. It provides a pulsed R.-F. output, thus assuring maximum activation of multiple electrostrictive sandwich type transducers.

The generator is provided with both coarse and fine frequency adjustment; also with grid current adjustment. It is also provided with a loading adjustment to compensate for the varying impedances encountered in operation of ultrasonic cleaning tanks. The generator employs a high-voltage input transformer which also functions as an R.-F. choke.

As an added feature the R.-F. generator of our present invention is provided with means for restraining the R.-F. field around the oscillator coil.

The features above referred to are important in an R.-F. generator intended for driving piezoelectric transducers employed for generating ultrasonic wave energy in a cleaning solvent or other liquid bath, since variations in depth of liquid and temperature, as well as variations in the transducer itself, affect both the frequency and the impedance of the load seen by the R.-F. generator. It is important, therefore, for maximum coupling efficiency, that the R.-F. generator be provided with means for readily adjusting the frequency of oscillation and the loading.

By employing a generator giving a pulsed R.-F. output, the peak power output is substantially greater than that of the average power output, and is capable of activating each transducer of a group of transducers despite slight variations which may exist among the individual transducer elements with respect to their frequency and capacitance. The pulsed output of the generator efficiently activates each individual transducer of the group of the duration of the pulse and results in maximum output for the entire group. Moreover, the resulting pulsing of the R.-F. output of the transducers has the important advantage of allowing relaxation of the cavitation and acoustical stress in the cleaning solution, thereby aiding in the removal of soil.

The employment of a high voltage step-up transformer having a large secondary inductive reactance permits the secondary to act as an R.-F. choke and makes unnecessary the use of a separate choke.

Our present invention will be best understood from a consideration of the following description of a preferred embodiment illustrated in the drawing in which.

Figure 1:
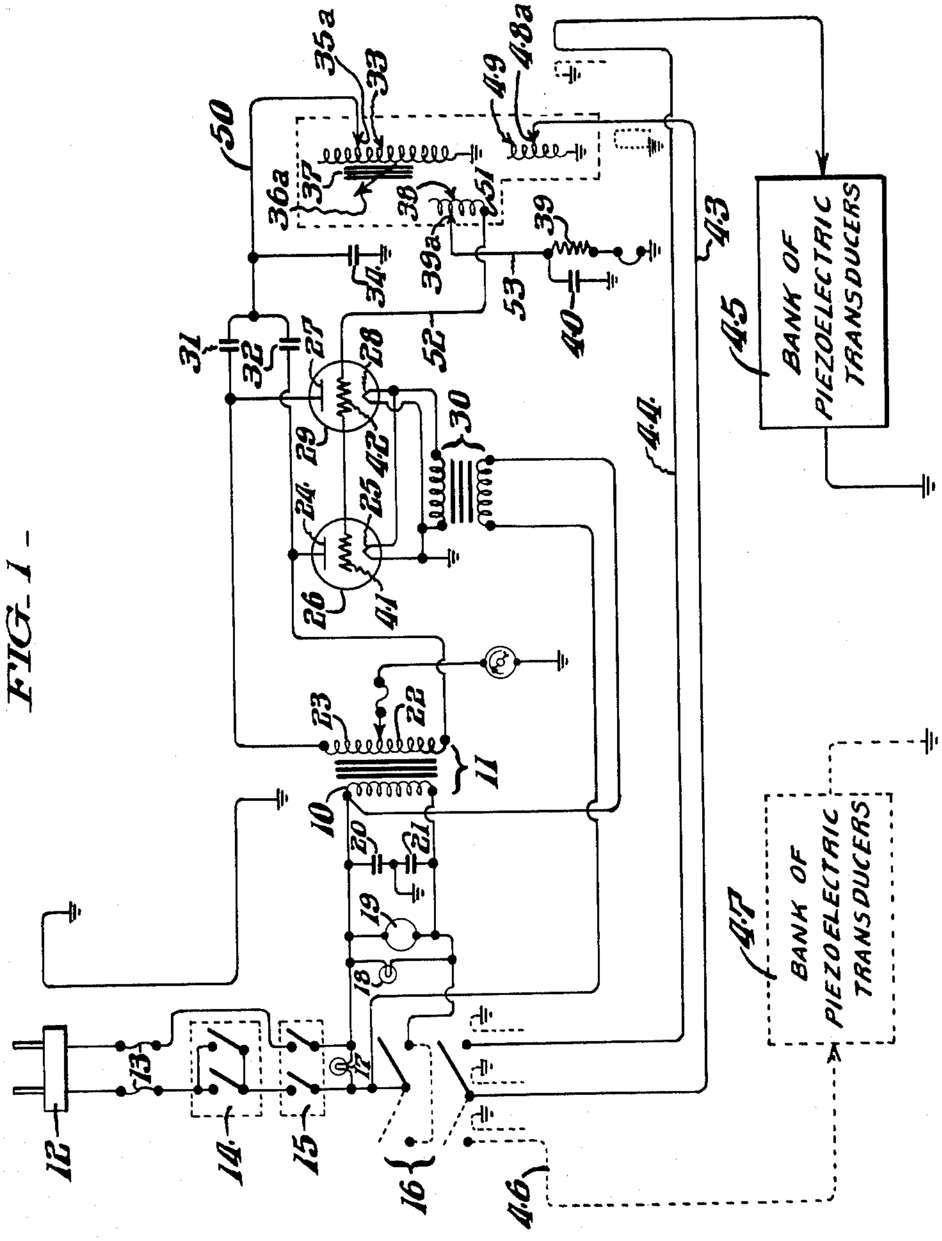
FIG. 1 is a schematic wiring diagram of a radio frequency generator embodying our present invention.

In describing the preferred embodiment of our invention illustrated in the drawing, specific terminology has been resorted to for the sake of clarity. However, it is not our intention to be limited to the specific terms so selected, and it is to be understood that each specific term includes all technical equivalents which operate in a similar manner to accomplish a similar purpose.

Referring now to FIG. 1, power from a source not shown, for example, a 110-volt 60-cycle source, is applied across the primary winding 10 of transformer 11 by way of a path which includes the plug 12, fuses 13, power "on" switch 16, stand-by switch 15, and interlock switch 14. Numerals 17 and 18 identify lamps, and 19 identifies a blower motor. Capacitors 20 and 21 are R.-F. bypass capacitors for passing to ground any R.-F. energy which may feed back from the R.-F. oscillator circuit located to the right of the transformer 11.

Transformer 11 is a high voltage step-up transformer adapted to step up the 110 volts applied across its primary 10 to a much higher voltage across the center-tapped secondary 22, 23. In a typical case, 2850 volts is developed across each section 22, 23 of the secondary. The high voltage developed across the lower section 22 is applied between the plate 24 and filamentary cathode 25 of the first oscillator tube 26, while the high voltage developed across the upper section 23 is applied between the plate 27 and filamentary cathode 28 of the second oscillator tube 29. Thus, the plates of the oscillator tubes 26 and 29 are pulsed alternately with positive pulses.

The transformer 30 supplies heating current to the filamentary cathodes 25, 28 of the oscillator tubes 26 and 29.

The output of the oscillator tubes 26 and 29 is applied by way of the R.-F. coupling capacitors 31 and 32 across an oscillator tank circuit comprising the oscillator tank coil 33 and the oscillator tank capacitor 34. The tank circuit is provided with a coarse frequency adjustment, represented in FIG. 1 by the arrow 35*a*, and also with a fine frequency adjustment, represented in FIG. 1 by the arrow 36*a* drawn through the core 37 of the coil.

Energy for feedback purposes, of the proper phase relationship between the plate and the grid of the oscillator tubes, is picked up in sufficient amplitude for proper tube operation. The A.-C. voltage, which is induced in coil 38, is applied to the oscillator tube grids 41, 42 and the A.-C. circuit is completed to ground through capacitor 40. The grid current flowing through grid resistor 39 develops the D.-C. bias voltage, which is applied to the grids of the oscillator tubes 41 and 42, through the low D.-C. resistance path of grid coil 38.

Output energy is taken from the oscillator tank circuit by means of the loading coil 49 and is applied by way of conductor 43, switch 16 when closed in the right-hand position, and conductor 44 to a first bank of parallel-connected piezoelectric transducers 45, which may, in a typical case, be barium titanate. When the switch 16 is closed in the left-hand position, the energy picked up by loading coil 49 is applied by way of conductor 43, switch 16 and conductor 46 to a second bank of parallel-connected piezoelectric transducers 47. The amount of energy picked-up by loading coil 49 is adjustable, as indicated by the arrow 48*a* in FIG. 1.

Figure 2:
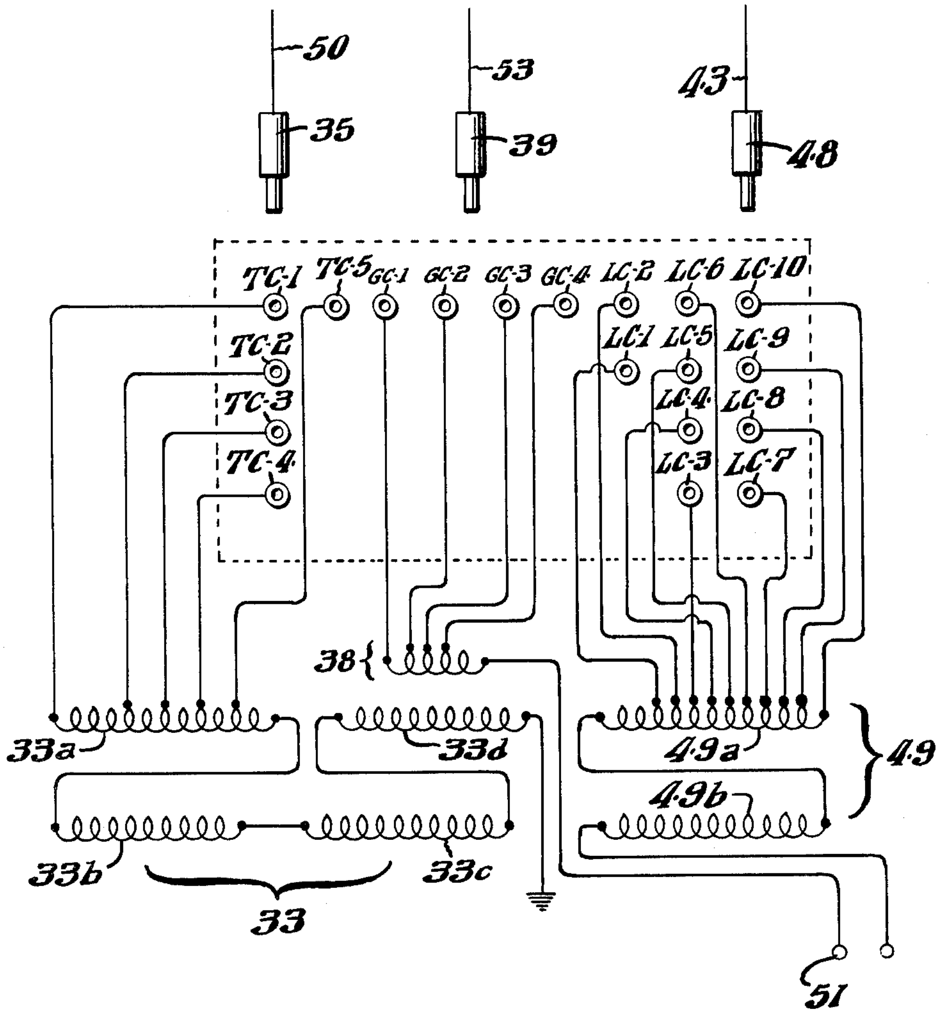
FIG. 2 is a schematic wiring diagram showing details of the oscillator tank coil, grid coil and loading coil.

In FIG. 2 is shown a preferred way of effecting the adjustments of the oscillator tank coil, grid coil, and loading coil, indicated in FIG. 1 by the arrows 35*a*, 39*a* and 48*a* respectively. As shown in FIG. 2, oscillator tank coil 33 comprises four windings 33*a*, 33*b*, 33*c*, and 33*d* connected in series. The lower end of the fourth winding 33*d* is connected to ground. The first winding 33*a* is provided with a connection at its upper end leading to jack TC–1. Four additional connections are provided on winding 33*a* at four spaced tap points leading to jacks TC–2, TC–3, TC–4 and TC–5, respectively. Jacks TC–1 to TC–5 are adapted to receive the plug 35, which is connected by lead 50 to the oscillator tank capacitor 34 and to the plates of the oscillator tubes 26 and 29 by way of the coupling capacitors 31 and 32.

Grid coil 38 is a single winding, the lower end of which is connected to a terminal 51 leading by way of lead 52 to the grids 41, 42 of the oscillator tubes. The upper end of grid coil 38 is connected to a jack GC–1. Grid winding 38 is provided with three additional connections at three spaced tap points leading to jacks GC–2, GC–3 and GC–4 respectively. The jacks GC–1 to GC–4 are adapted to receive the plug 39 connected by lead 53 to the grid resistor 39 and grid capacitor 40.

Loading coil 49 comprises two windings in series, 49*a* and 49*b*, wound in two layers, an outer layer 49*a* and an inner layer 49*b*. The lower end of winding 49*b* is connected to ground. The upper end of winding 49*a* is connected to a jack LC–10. Loading coil winding 49*a* is provided with nine additional connections at nine spaced tap points leading to jacks LC–9 to LC–1, respectively. The jacks LC–10 to LC–1 are for receiving the plug 48 which is connected by way of lead 43 to the center connection of the switch 16.

In operation, plug 35 and jacks TC–1 to TC–5 function as the means for effecting coarse adjustment of the oscillator frequency.

Plug 39 and jacks GC–1 to GC–4 function as the means for adjusting the grid current and hence the efficiency of the oscillation.

Plug 48 and jacks LC–10 to LC–1 function as the means for adjusting the output, thereby to compensate for the variations in the load impedance of the piezoelectric transducers encountered during operation of the ultrasonic cleaning tank.

Figure 3:
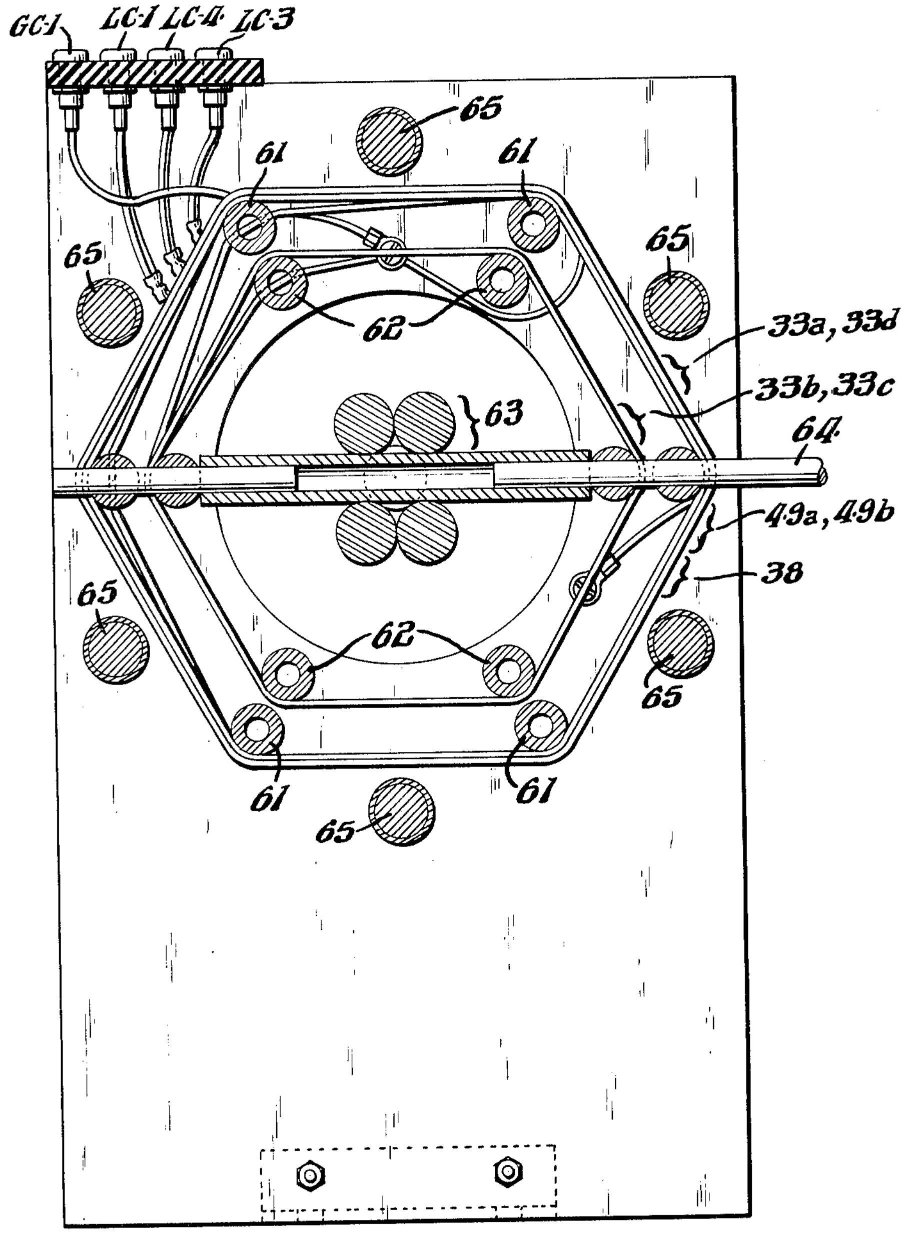
FIG. 3 is a view, in section, of the oscillator tank coil structure showing the ferrite bars which function to restrain the R.-F. field within the coil.

FIG. 3 is a cross sectional view of the oscillator coil assembly. In FIG. 3 windings are shown wound about the outer spacers 61 to form the top oscillator tank coils 33*a*, 33*d* of FIG. 2. The bottom oscillator tank coils 33*b*, 33*c* of FIG. 2 are formed by windings wound about the inner spacers 62. Also shown in FIG. 3 (without any effort being made to distinguish therebetween or from the windings of oscillator tank coils 33a, 33*d*) are the windings of loading coils 49*a*, 49*b* and of the grid coil 38. These windings are connected to various jacks of which grid jack GC–1 and loading coil jacks LC–1, LC–4 and LC–3 appear in FIG. 3.

As described above in connection with FIG. 2, coarse frequency tuning of the oscillator is achieved by moving plug 35 to a different jack.

Fine frequency tuning of the oscillator is accomplished by changing the rotational position of the ferrite tuning core 63 shown in FIG. 3. The core 63 is movable in a rotational direction by means of a shaft 64 and a vernier dial, not shown.

The R.-F. field of the oscillator coil is restrained withing the coil itself by insetting a plurality of ferrite bars 65 around the periphery of the coil on substantially equal spacings. In the particular construction illustrated in FIG. 3, six such ferrite bars are used.

In a typical case, the oscillator of our invention, used as a means of driving a bank of piezoelectric transducers for ultrasonically agitating a liquid bath, may have a frequency range of from 24 to 32 kilocycles (kc.).

Since the oscillator tubes 26, 29 are driven, alternately on the positive pulses, the oscillator provides a pulsed output of R.-F. energy. When applied to a bank of piezoelectric transducers connected in parallel, such pulsed R-F energy is capable of activating each transducer of the bank to a maximum degree, despite slight variations in frequency and capacitance of one transducer element to another. Furthermore, since the transducers deliver a pulsed output in response to the pulsed R.-F. energy applied thereto, the pulsed output of the transducers allows relaxation of the cavitation and the acoustical stress in the cleaning solution, thereby aiding the removal of soil. In a typical case, the oscillator may have a nominal rating of 500 watts average output, with a peak output of 1000 watts. It will be noted that the oscillator tubes, operating alternately on the positive pulses, require only a single set of grid components 38, 39, 40.

As indicated before, an R.-F. oscillator for driving a bank of piezoelectric transducer elements for ultrasonically agitating a liquid bath, must provide for the condition that the individual transducers will vary among themselves to a certain extent due to practical tolerances; also the depth of the cleaning fluid and the temperature of the bath will likewise vary. These factors will affect both the frequency and the impedence of the load seen by the driving generator. Accordingly, it is necessary that the driving generator, in order to have maximum coupling efficiency, be provided with means for adjusting both its frequency and its output impedance. Such adjustments are provided in the oscillator of our invention. In a typical case, the piezoelectric transducers have a capacitive reactance of approximately 20 ohms which is substantially matched by the inductive reactance of the loading coil 49.

As an added feature, the secondary windings 22–23 of the high voltage transformer 11 are of such high inductive reactance as to enable the transformer secondary to be used as an R.-F. choke coil, thereby eliminating the need for a separate R.-F. coke coil. As a result of this arrangement, the R.-F. loss in the high voltage transformer 11 is reduced to approximately 1 percent of the average output rating and ½ percent of the peak output rating. To accomplish this result, the transformer 11 is provided with two type "C" cores. These cores are formed from grain oriented silicon steel strip. The last two layers of the secondary windings are scattered wound in order to lower the turn-to-turn capacity. Mica insulation is used to insulate the high voltage secondary windings from the transformer core in order to eliminate the possibility of corona leakage of the R.–F. which might otherwise result from the use of the secondary windings as an R.-F. choke.

While the preferred embodiment of our invention has been described in some detail, it will be obvious to one skilled in the art that various modifications may be made without departing from the invention as hereinafter claimed.

Having described our invention, we claim:

1. A radio-frequency generator comprising: an oscillator including a pair of amplifier devices each having two input connections and two output connections one of which is common; a common tank circuit comprising an inductance coil and a capacitance connected across the output connections of both amplifier devices; a common input circuit connected across the input connections of both amplifier devices, said input circuit including a feedback coil mutually coupled to the inductance coil of said tank circuit; a high-voltage step-up transformer having a primary and a center-tapped high-inductance secondary, the impedance of said secondary at the frequency of said oscillator being sufficiently high to allow said secondary to function as a radio-frequency choke; means for applying a low-frequency alternating-current voltage across the primary of said transformer; means for coupling one section of said center-tapped secondary across the output connections of one of said amplifier devices and the other section of said center-tapped secondary across the output connections of the other of said amplifier devices, thereby to pulse said amplifier elements alternately at a pulse repetition frequency which is low relative to the oscillation frequency of said tank circuit for developing a series of pulsed radio-frequency oscillations; and an output coil mutually coupled to the inductance coil of said tank circuit for developing a pulsed oscillation output; said inductance coil, feedback coil and output coil comprising a mutually-coupled oscillator-coil assembly having a plurality of spaced-apart outer spacers and a plurality of spaced-apart inner spacers; a rotatable ferrite tuning core within the area bounded by said inner spacers; a plurality of spaced-apart ferrite bars outside of said ring of outer spacers, a portion of the windings of said inductance coil, feedback coil and output coil being wound about said inner spacers, the remaining portion of said windings being wound about said outer spacers, said spaced-apart ferrite bars functioning to restrain the radio-frequency field of the oscillator inductance coil within the coil assembly.

2. Apparatus as claimed in claim 1 characterized in that said oscillator coil assembly is provided with a plurality of jacks, and with connections from said jacks to various tap points on said tan coil, feedback coil and output coil.

References Cited by the Examiner

UNITED STATES PATENTS

| | | | |
|---|---|---|---|
| 1,658,970 | 2/1928 | Colburn | 336—190 X |
| 1,796,071 | 3/1931 | Woodworth | 331—71 X |
| 2,198,073 | 4/1940 | Bayless et al. | 331—71 |
| 2,213,820 | 9/1940 | Maxson | 331—71 |
| 2,377,456 | 6/1945 | Spitzer | 331—71 |
| 2,532,455 | 12/1950 | MacSorley | 331—179 |
| 2,538,541 | 1/1951 | Tourshou | 331—181 X |
| 2,554,124 | 5/1951 | Salmont | 331—71 X |
| 2,612,545 | 9/1952 | Gray | 336—196 X |
| 2,722,663 | 11/1955 | Visch | 336—87 |
| 2,911,604 | 11/1959 | Krause | 336—196 X |

FOREIGN PATENTS

| | | |
|---|---|---|
| 830,260 | 3/1960 | Great Britain. |

OTHER REFERENCES

Bolton, "Orientating Grains in Transformer Steel," General Electric Review, May 1953, pp. 13–16.

Hull, "An Electron Tube Transmitter of Completely Modulated Waves," Scientific Papers of the Bureau of Standards, No. 381, June 18, 1920, pp. 259–271.

ROY LAKE, *Primary Examiner.*

J. B. MULLINS, *Assistant Examiner.*